United States Patent [19]

Kiss et al.

[11] Patent Number: 4,991,612
[45] Date of Patent: Feb. 12, 1991

[54] STORAGE MECHANISM FOR VEHICLE COVERING

[76] Inventors: Jozsef Kiss, 8 Woodman Dr. S., Hamilton, Ontario, Canada, L8K 4C9; John P. Stricker, RR #1, Brantford, Ontario, Canada, N3T-5L4

[21] Appl. No.: 426,075

[22] Filed: Oct. 23, 1989

[51] Int. Cl.⁵ ............................................. E04H 15/54
[52] U.S. Cl. ........................................ 135/88; 135/90; 135/903
[58] Field of Search ................... 135/88, 90, 903, 904, 135/905

[56] References Cited

U.S. PATENT DOCUMENTS

| | | |
|---|---|---|
| 1,918,423 | 7/1933 | Persinger . |
| 2,097,923 | 11/1937 | Hutchinson ......................... 135/903 |
| 2,585,449 | 2/1952 | Eskew ................................. 135/903 |
| 2,679,254 | 4/1954 | Green . |
| 2,896,651 | 7/1959 | Hilligoss .............................. 135/903 |
| 3,026,886 | 3/1962 | Francis ................................. 135/90 |
| 3,050,075 | 8/1962 | Kaplan et al. . |
| 4,305,415 | 12/1981 | Galli . |
| 4,732,421 | 3/1988 | Ross et al. . |
| 4,834,128 | 5/1989 | Burgess .............................. 135/903 |

Primary Examiner—Henry E. Raduazo

[57] ABSTRACT

A mechanism for storing an automotive vehicle covering, that includes a reel structure in near adjacency to the vehicle for winding the covering into a compact package. The covering may be pulled off the reel structure and directly onto the vehicle. After placement of the covering on the vehicle the covering is detached from the reel structure. The reel structure can be swung away from the vehicle when necessary to permit use of the space normally occupied by the reel structure.

1 Claim, 1 Drawing Sheet

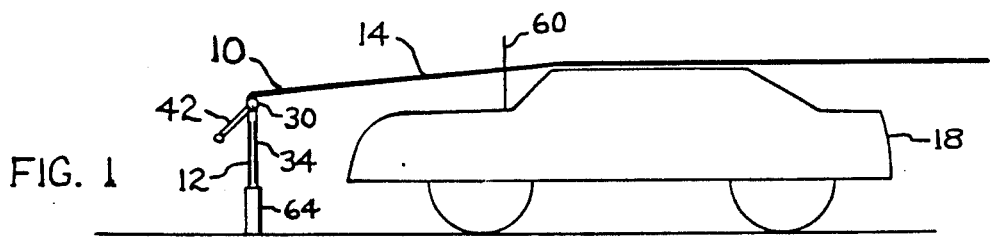
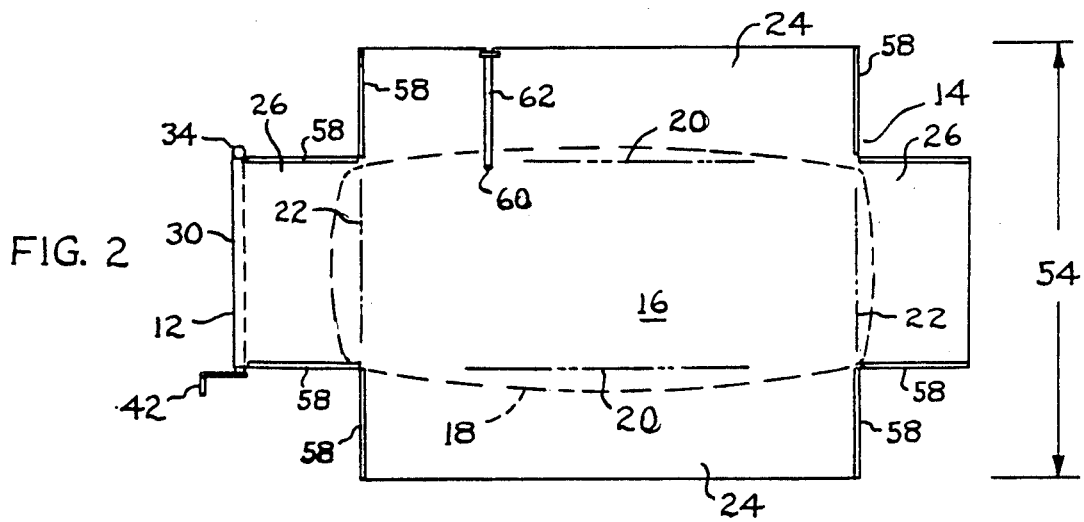
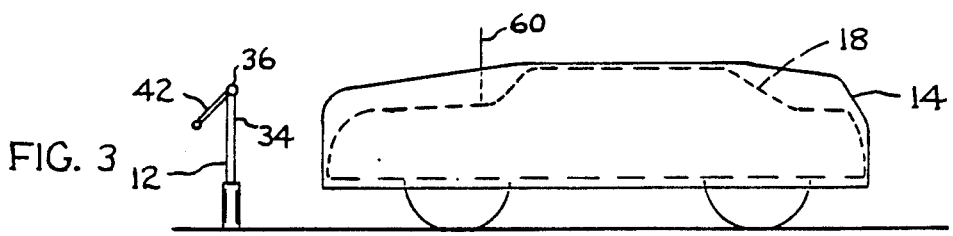
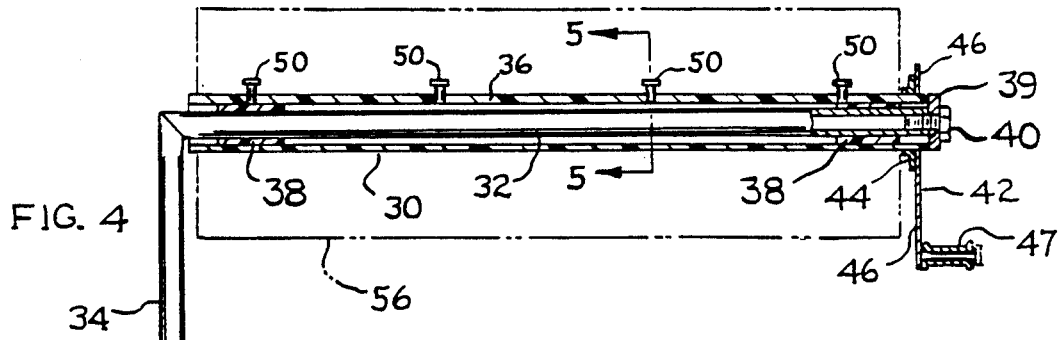
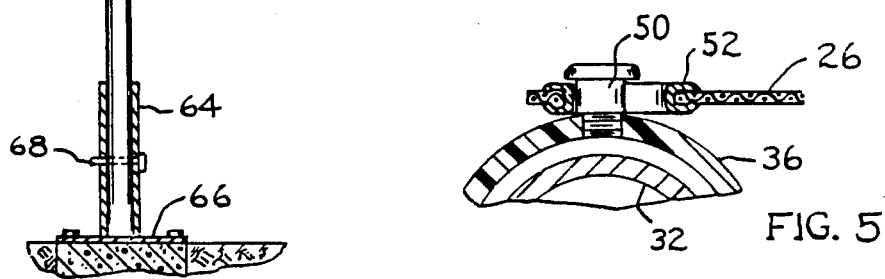

4,991,612

STORAGE MECHANISM FOR VEHICLE COVERING

BACKGROUND AND SUMMARY OF THE INVENTION

This invention relates to a mechanism for covering an automotive vehicle to protect it from the weather elements. The vehicle-covering mechanism comprises a flexible non-porous fabric sheet having a detachable connection with a horizontal axis reel structure. Manual operation of a hand crank associated with the reel structure will cause the fabric sheet to be wound onto the reel structure for compact storage off of the vehicle. The fabric sheet can be pulled off of the reel structure and onto the vehicle, to facilitate placement of the covering sheet around the vehicle.

Prior to our invention others have proposed mechanisms for storing vehicle covering fabric sheets when the covering sheets are not being used to protect the vehicle from the weather elements. N. Persinger U.S. Pat. No. 1,918,423 shows a vehicle cover mechanism installed on the rear bumper of a vehicle. A flexible cover is adapted to be unwound from a drum within a cylindrical casing for extension over the vehicle exterior surface. The arrangement of U.S. Pat. No. 1,918,423 is disadvantageous in that the cover assembly adds to the overall weight of the vehicle, thereby increasing fuel consumption. Also, the casing for the vehicle cover projects from the vehicle exterior surface so as to make in difficult to maintain a streamlined vehicle appearance. Further, the coil spring retraction mechanism within the drum structure would have to be a relatively heavy high load structure; there is some danger that the coil spring mechanism would inadvertently retract the flexible cover into the cylindrical casing at an inopertune time.

R. Kaplan U.S. Pat. No. 3,050,075 et al. shows a flexible cover mechanism installed on the roof of a vehicle. The mechanism comprises two separate flexible sheets are withdrawable from a central casing 16 in opposite directions to extend over front and rear sections of the vehicle. The arrangement of U.S. Pat. No. 3,050,075 has some of the disadvantages of the mechanism shown in previously mentioned U.S. Pat. No. 1,918,423.

G. Green U.S. Pat. No. 2,679,254 shows a vehicle-covering mechanism that includes a cable 6 having one end connected to a section 2a of a webbing strip 2 that runs along the longitudinal centerline of a flexible cover 1. A counterweight 18 within a hollow post 7 provides a force for pulling cable 6 onto the post. The cable in turn pulls the attached cover 1 against the post. FIG. 5 of the patent drawings shows the cover furled around post 7. It is not entirely clear whether the furling action occurs automatically or by reason of manual rotary manipulation of the cover around the post.

Our proposed vehicle-covering mechanism is designed to have the self-storing feature of the prior art, while being constructible at relatively low cost. The mechanism operates without springs or counterweights.

THE DRAWINGS

FIG. 1 is a side elevational view of a mechanism constructed according to the invention. The mechanism includes a flexible cover shown in a partially unfolded position extended over an automotive vehicle.

FIG. 2 is a top plan view of the FIG. 1 mechanism.

FIG. 3 is a side elevational view taken in the same direction as FIG. 1, but with the flexible cover draped over (around) the associated vehicle.

FIG. 4 is a front elevational view of the FIG. 1 mechanism, taken on a larger scale to show structural details.

FIG. 5 is a fragmentary sectional view on line 5—5 in FIG. 1.

DESCRIPTION OF A PREFERRED EMBODIMENT OF THE INVENTION

FIG. 1 shows in side elevation a vehicle-covering mechanism 10 that includes a stationary storage device 12 for a flexible covering sheet structure 14. The covering sheet structure includes a rectangular main cover section 16 (FIG. 2), side flaps 24, and end flaps 26. Main section 16 is adapted to extend over upper surface areas of a conventional automotive vehicle 18. Main cover section 16 has two longitudinal side edges 20 and two transverse end edges 22. Edges 20 form the demarcation lines between section 20 and side flaps 26. Edges 22 form the demarcation lines between section 20 and end flaps 26. Edges 20 and 22 are imaginary lines denoting the fold lines between main cover section 20 and flaps 24 and 26. Side flaps 24 are adapted to extend downwardly along side surfaces of vehicle 18. End flaps 26 are adapted to extend downwardly along end surfaces of vehicle 18.

One of the end flaps 26 is detachably connected to a reel structure 30 that forms part of the aforementioned storage device 12. As shown in FIG. 4, the reel structure comprises a horizontal shaft 32 that extends in cantilever fashion from the upper end of an upstanding support post 34. Horizontal shaft 32 is shown as a hollow pipe-like member, although it could be a solid rod structure if so desired. An elongated cylindrical tube 36 encircles shaft 32 for rotation around the shaft axis. Bushings 38 are press fit into the ends of tube 36 to rotatably support the tube on shaft 32. The tube is retained against axial displacement off of shaft 32 by means of a circular plate 39 that is secured to shaft 32 by a screw 40; the screw is threaded into a threaded opening in the end of the shaft. Various different devices could be used to retain tube 36 on shaft 32.

A hand crank structure 42 is operatively attached to tube 32 for imparting a turning force thereto. As shown in FIG. 4, the hand crank structure comprises a flanged collar 44 encircling the tube, and a plate 46 affixed to the collar 44 flange. A bolt is threaded into a threaded opening in the outer end of plate 46 to freely support an annular handle 47. Manual rotation of crank structure 42 imparts a rotary turning force to tube 36.

End flap 26 of cover structure 14 has a number of openings spaced along its transverse free edge for detachable engagement with hooks that project from the surface of tubular reel element 36. As shown in FIGS. 4 and 5, these hooks take the form of headed pins 50 that are screwed into threaded holes in tubular element 36. Circular grommets 52 are affixed to flap 26 at spaced points along the flap free edge for placement over pins 50, as shown in FIG. 5. The arrangement is such that flap 26 can be attached to, or removed from, reel structure 30 (tube 36) with relatively little manual effort.

It can be seen from FIG. 2 that the total width of cover structure 14 (dimension 54) is greater than the axial dimension of reel structure 30. However, by folding side flaps 24 onto the upper surface of main cover section 16 it is possible to effectively reduce the transverse width of the flexible covering to slightly less than the axial length of reel structure 30. It then becomes possible to wind the flexible covering onto (and around) tube 36 by manual rotation of hand crank 42. Dashed lines 56 in FIG. 4 indicate generally the outline configuration of the flexible covering after roll up thereof around the reel structure. Straps, not shown, may be extended around the rolled up covering to retain it from inadvertant unwinding.

The flexible covering may be adjusted from its rolled-up storage condition (FIG. 4) to a "use" condition by a manual pulling force on the outermost end flap 26 (right flap 26 in FIG. 2). The required manual pulling force can be applied after vehicle 18 has been driven to a position in close adjacency to the storage device, as shown in FIG. 1. The flexible covering 14 can be pulled to the right (FIG. 1) to a position extended above the vehicle. The flexible covering will then be allowed to drape itself onto the vehicle by gravitational action. Next, the left most end flap 26 will be disconnected from reel structure 30 and then allowed to drape itself against the vehicle end surface. Side flaps 24 will be unfolded to extend downwardly along side surfaces of the vehicle.

In order for the flexible covering to have a close fit around the vehicle the adjoining edges of flaps 24 and 26 may be connected together by means of zippers or other equivalent devices. In FIG. 2 numerals 58 indicate zipper elements extending along adjoining edge areas of flaps 24 and 26. FIG. 3 shows approximately how the covering fits around the vehicle (with zippers 58 interlockingly connected).

Many vehicles are equipped with radio antennae of the non-retracting type. FIGS. 1 through 3 show an antenna 60 projecting upwardly from the vehicle surface. A slit 62 may be formed in flexible covering 14 to permit the antenna to extend upwardly through the covering without damaging the antenna structure.

The storage device 12 for covering 14 may be supported for rotatable adjustment around the axis of vertical post 34. As shown in FIG. 4, post 34 has its lower end seated within a socket structure formed by circular sleeve 64 and stationary base plate 66; sleeve 64 is welded to plate 66. A transverse pin 68 can be extended through aligned holes in sleeve 64 and cylindrical post 34, to thereby prevent post 34 (and reel structure 30) from rotating around the post axis. By removing pin 68 from the aligned holes it becomes possible to rotate the assembly of post 34 and reel structure 30 around the post axis.

Rotatable adjustment of assembly 34, 30 is used to swing the assembly out of a position where it might interfere with normal use of the space occupied by the assembly. For example, if reel structure 30 is located above a driveway surface it may be desirable to temporarily swing the reel structure to a position spaced laterally from the driveway surface in order to permit the driveway to be used for vehicle passage purposes. Rotary adjustment of assembly 34, 30 can be one hundred eighty degrees, measured around the axis of post 34. Pin 68 can be used to retain post 34 in either its normal position or in its rotated position displaced laterally from the driveway surface. It will be understood that when flexible covering 14 is being wound onto or off of reel structure 30, pin 68 will be extended through the aligned holes in post 34 and socket element 64, such that the post is immovably anchored to the ground surface.

As shown in FIG. 1, reel structure 30 is located above the plane of the vehicle hood and below the plane of the vehicle roof. The preferred location of reel structure 30 is about four feet above the ground (pavement) surface. In such a location the hand crank 42 can be readily operated to roll covering 14 onto the reel structure. Also, the covering is sufficiently elevated above the ground surface so that it can be easily pulled off the reel structure directly onto the roof area of the vehicle. Comparatively little time is required to install the covering on a vehicle or return the covering to a storage position.

It will be noted that the storage mechanism shown in FIG. 4 is formed out of structural components that are commercially available. No special castings or molded components are required. Consequently, essentially no pre-production tooling expense is involved.

We claim:

1. In combination, a flexible covering for an automotive vehicle, including a main cover section adapted to extend over upper surface areas of a vehicle, said main cover section having two longitudinal side edges and two transverse end edges; said flexible covering further including two side flaps hingedly connected to the side edges of said main cover section for extension downwardly along side surfaces of a vehicle, and two end flaps extending from opposite end edges of the main cover section for extension downwardly along end surfaces of a vehicle;

a vertical post (34) defining a swing axis, a horizontal shaft (32) extending from the upper end of the shaft so that the post acts as a cantilever support for the shaft, said post and shaft being constructed so that the shaft can swing in a horizontal arc between a first position in the path of an automotive vehicle and a second position extending away from the vehicle path;

a tubular reel member (36) extending around and along said horizontal shaft, bushings (38) carried within the tubular member for rotatably supporting said member on the shaft; said shaft having a length greater than the length of the tubular reel member so that the end of the shaft remote from the vertical post extends outwardly beyond the reel member; means (at 39, 40) for preventing axial dislocation of the tubular reel member off the shaft; a hand crank connected to said reel member at the end thereof remote from the vertical post;

means for detachably connecting one of said end flaps to said tubular reel member, said detachable connecting means comprising a plurality of headed pins (50) extending radially outwardly from the tubular reel member at spaced points therealong, and a plurality of annular grommets (52) affixed to said one end flap; said grommets having openings therethrough that have a larger diameter than the heads on the associated pins, whereby the flexible covering can be disengaged from the reel member;

said side flaps and said end flaps having connection mechanisms (58) for holding the flaps in positions extending downwardly along the associated vehicle surfaces when the flexible covering is disengaged from the reel member and the main cover section is laid on the vehicle roof;

said side flaps being foldable onto the upper face of said main cover section when it is desired to roll the flexible covering onto and around the tubular reel member, the transverse width of the flexible covering then being less than the axial length of the tubular reel member, whereby the hand crank can be operated to wind the covering onto the reel member for compact storage.

* * * * *